United States Patent
Barrett et al.

[11] Patent Number: 5,865,363
[45] Date of Patent: Feb. 2, 1999

[54] CONSTRUCTION AND METHOD OF MAKING PROP SHAFT HAVING ENLARGED END SECTIONS

[75] Inventors: Mark S. Barrett, Orion; Thomas J. Oldenburg, Swartz Creek, both of Mich.

[73] Assignee: American Axle & Manufacturing Inc., Detroit, Mich.

[21] Appl. No.: 888,512

[22] Filed: Jul. 7, 1997

[51] Int. Cl.⁶ .................................................. B23K 31/02
[52] U.S. Cl. ....................................................... 228/173.4
[58] Field of Search ............................ 228/173.1, 173.4, 228/135; 29/895.22; 464/134

[56] References Cited

U.S. PATENT DOCUMENTS

| | | | |
|---|---|---|---|
| 4,331,280 | 5/1982 | Terabayashi et al. | 228/112 |
| 4,541,655 | 9/1985 | Hunter | 285/55 |
| 4,881,924 | 11/1989 | Gall | 464/134 |
| 5,320,579 | 6/1994 | Hoffmann | 464/181 |
| 5,643,093 | 7/1997 | Breese | 464/183 |

*Primary Examiner*—Samuel M. Heinrich
*Attorney, Agent, or Firm*—Reising, Ethington, Learman & McCulloch

[57] ABSTRACT

An automotive prop shaft assembly particularly suited for coupling a transfer case to the front axle drive components comprises a tubular drive shaft having an initial uniform inner diameter relatively smaller than the outer diameter of a pair of forged insert yokes to be attached to the ends of the shaft. A section of each end of the tube is enlarged so that its inner diameter is sized to receive the yokes into the ends of the tube with an interference fit. The shaft and yokes are then welded together and weights fixed to the end sections to correct for imbalance.

7 Claims, 1 Drawing Sheet

CONSTRUCTION AND METHOD OF MAKING PROP SHAFT HAVING ENLARGED END SECTIONS

This invention relates generally to propeller shaft assemblies for automotive vehicles and particularly to the construction of the tubular drive shaft portion and its connection with the end yokes of the assembly.

BACKGROUND OF THE INVENTION

Prop shaft assemblies of the above type are often used in automotive applications to couple the transmission and/or transfer case of a vehicle to the axles in order to transfer power to the wheels.

In a typical prop shaft assembly, a pair of forged end yokes are provided, each having an attachment collar at one end which is press fit together with the opposite ends of a tubular drive shaft and then welded to the shaft to secure them in place. In applications where there is sufficient clearance to accommodate a large diameter drive shaft, it is preferred that the drive shaft employed be one having an inner diameter sufficiently large to accommodate the press fit insertion of the yoke collars into the ends of the shaft, as opposed to using a smaller diameter drive shaft whose outer diameter enables the ends of the shaft to be extended into the collars. One reason the large diameter shaft construction is preferred is that it is comparatively simpler and more cost effective from a manufacturing standpoint to machine the outside diameter of the yoke collars to prepare them for press fit extension and welding within the drive shaft tube, rather than having to machine the inside diameter surface of the collar to accept the shaft.

In some applications, however, the available space for the prop shaft assembly, and particularly the clearance for the shaft which must extend linearly between the yokes, is limited to such a degree that the preferred large diameter drive shaft construction cannot be used. A typical example of such limited clearance applications is front drive axle arrangements, where the prop shaft competes for space with the routing of the exhaust system and various other components in the vicinity of the engine compartment.

The solution, thus far, to such limited space requirements has been to utilize the less desirable small diameter drive shaft construction. In addition to the machining difficulties mentioned above, a small diameter drive shaft is more difficult and costly to balance. Balancing the shaft assembly involved applying weights to the end regions of the shaft to compensate for any imbalance of the assembly. The smaller diameter drive shaft offers less area on which to mount the balancing weights, as well as less net balance correction for attached weight due to the direct relationship between balance weight effectiveness and tube diameter and certain accommodations must be made for the smaller shafts since much of the standard equipment used to support the assembly and apply the weights is set up for the large diameter assemblies.

SUMMARY OF THE INVENTION

According to the invention, a prop shaft assembly has an initial small diameter drive shaft whose outer diameter is sufficiently small to accommodate a limited routing space environment. The opposite ends of the small diameter drive shaft are then enlarged in order that the inner diameter of the end portions are sized to receive with a press fit the collars of a pair of end yokes into the ends of the drive shaft tube which are then welded in the usual manner.

The invention thus provides a drive shaft that is a hybrid of sorts between the small and large diameter shafts mentioned above. The shaft has a small diameter mid-section that addresses the limited routing space requirements of many front drive axle applications, yet has large diamater end sections to advantageously receive the collars of the yokes into the ends of the shaft. Such hybrid construction thus combines the benefits offered by both the large and small diameter drive shaft while overcoming these limitations. The enlarged ends make it possible to utilize the preferred outer diameter machining of the yoke collars and further enable the shaft assembly to be balanced using standard balance weights and balancing equipment designed for the large diameter tube assemblies.

DRAWINGS

A presently preferred embodiment of the invention is disclosed in the following description and in the accompanying drawings, wherein.

DETAILED DESCRIPTION

Figure 1:
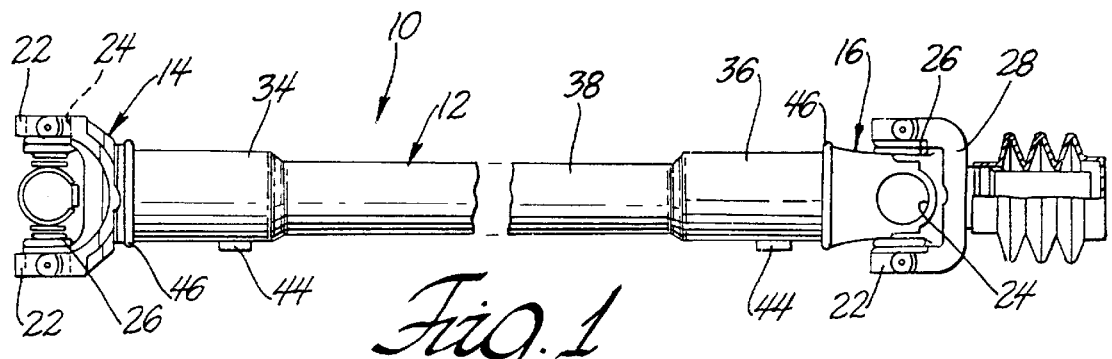
FIG. 1 is a longitudinal fragmentary front elevation view of a propeller shaft assembly constructed in accordance with a presently preferred embodiment of the invention.
Figure 2:
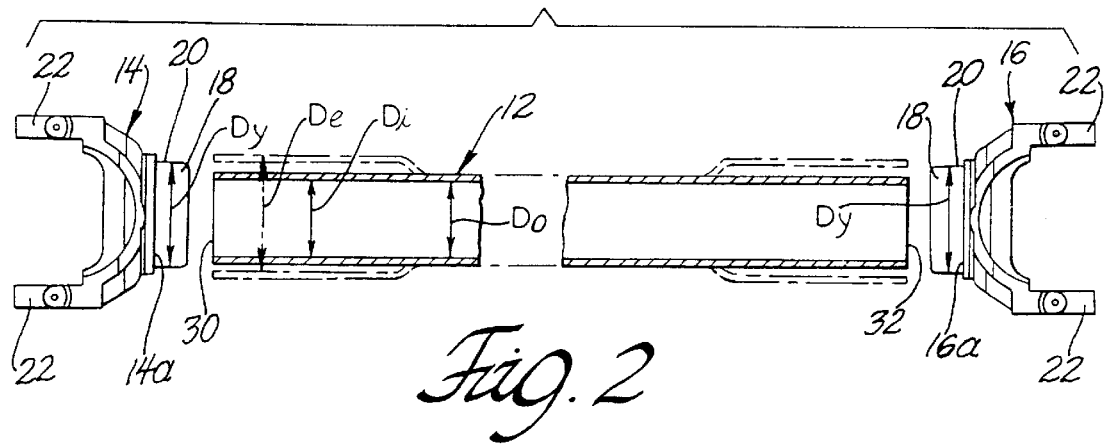
FIG. 2 is an enlarged fragmentary exploded view of the prop shaft components of FIG. 1 with the shaft in a pre-enlarged, pre-assembled condition.

Referring now to FIG. 1, an automotive propeller shaft assembly constructed in accordance with a presently preferred embodiment of the invention is indicated generally by the reference numeral 10 and comprises an elongate drive shaft 12 having yokes 14, 16 attached to its opposite ends.

The yokes 14, 16 are forged components, each having a connecting collar or shank 18 at one end presenting an outer mating surface 20 machined to a predetermined diameter $D_y$. Laterally spaced ears 22 are formed at the opposite end of the yokes 14, 16. The ears 22 are formed with aligned cross holes 24 for journaling, in the usual manner, a spider 26 carried by another yoke 28 to provide a Cardan-type universal joint at each end of the shaft 12.

The shaft 12 comprises a longitudinally extending length of cylindrical metal tubing material having opposite open ends 30, 32 thereof. Initially, the tubular shaft 12 is of uniform small diameter along its length so as to be undersized with respect to the yokes 14, 16 that is attached to. The shaft 12 has an initial outer diameter $D_o$ that is relatively smaller than that of the diameter $D_y$ of the yoke shanks 18. The small outer diameter size of the tube 12 is selected to facilitate linear routing of the shaft 12 in applications where space is limited, such as, for example, in automotive front axle applications for coupling a vehicle's transfer case to the front axle drive components.

In the example illustrated, the shaft has an initial outer diameter $D_o$ of about 44.5 mm with a uniform minimum wall thickness of about 2.4 mm and an overall length dimension of about 679–740 mm. While specific dimensions and ranges are given above for purposes of illustration, those skilled in the art will appreciate that other dimensions are possible and contemplated by the invention based on the particular space limitations and length requirements for the particular application.

The tubular shaft 12 has an initial inner diameter $D_I$ that is governed in part by the initial outer diameter $D_o$ and the wall thickness of the tube but, in any event is smaller in diameter than that of the outer diameter $D_y$ of the yoke collars 18.

In accordance with the invention, opposite end sections 34, 36 of the shaft 12 are enlarged to an expanded inner diameter $D_e$ of sufficient size to provide a press fit connection with the collar 18 of the yokes 14, 16. In example illustrated, the shaft 12 has an expanded inner diameter $D_e$ in the range of about 49.2 to 49.33 mm, which corresponds in size with the diameter $D_y$ of the yoke collars 18. The small diameter midsection 38 of the shaft is unaffected by the enlargement of the end sections 34, 36 and as such retains the original diameter and wall thickness dimensions.

The enlargement of the end sections 34, 36 of the shaft 12 may be carred out by a mechanical forming or flaring operation in which the shaft 12 is clamped in a fixture (not shown) and an enlarged forming mandrel (not shown) extended into each of the open ends 30, 32 to stretch the tubing 12 in the vicinity of the end sections 34, 36 to the enlarged inner diameter $D_e$. The enlargement of the end sections 34, 36 produces a corresponding reduction in their wall thickness by about 0.3 mm.

Figure 3:
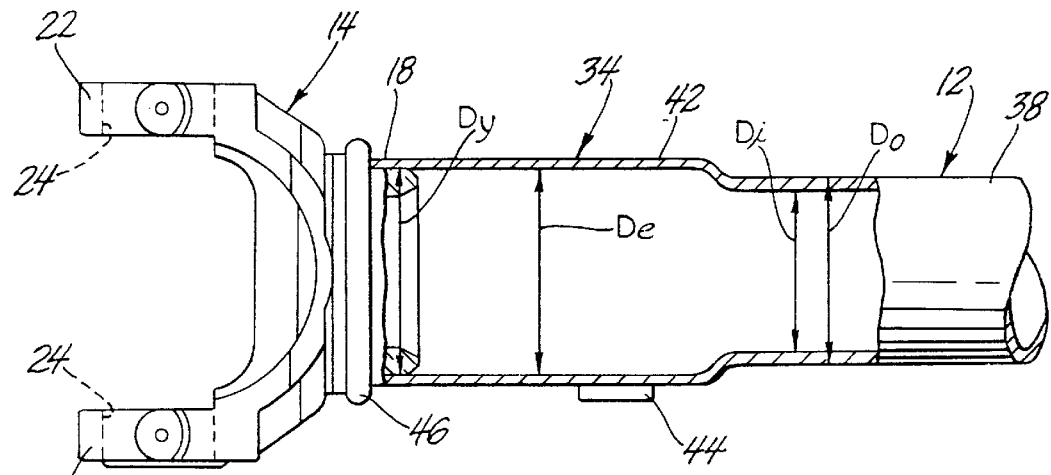
FIG. 3 is an enlarged fragmentary longitudinal view, shown partly in section, of an end of the prop shaft assembly.

As illustrated best in FIG. 3, the length of the enlarged end sections 34, 36 is relatively greater than that of the length of the yoke shanks 18. The extended length provides a region 42 inward of the yokes 14, 16 for engaging and supporting the shaft 12 during insertion of the collars 18 into the ends of the shaft 12. The region 42 further provides a location for engaging and supporting the shaft 12 by a standard large diameter balancing fixture (not shown) and for attaching one or more standard large diameter balance weights 44 along each of the end sections 34, 36.

After the enlarged end sections 34, 36 have been formed, the yokes 14, 16 are attached by press fitting the shanks 18 of the yokes into the open ends 30, 32 of the end sections 34, 36 until the end of the shaft 12 confront abutting shoulders 14a, 16a of the yokes 14, 16, respectively. The yokes 14, 16 are then fixed permanently to the shaft 12 by weldments 46 in the usual manner.

The balance weights 44 are selected and secured preferably by welding in the appropriate locations on the end sections 34, 36 to correct any imbalance of the assembly 10. The extended length of the end sections 34, 36 enables the weights 44 to be attached at a location longitudinally spaced from the insert shanks 18 of the yokes 14, 16 so as not to impair the integrity of the yoke-to-shaft weldments 46.

The disclosed embodiment is representative of a presently preferred form of the invention, and is intended to be illustrative rather than definitive thereof. The invention is defined in the claims.

We claim:

1. A method of manufacturing an automotive prop shaft assembly comprising the steps of:

providing a pair of end yokes each having an insert collar of a predetermined outer diameter;

providing an elongate metallic tubular drive shaft member having opposite ends and an initial uniform inner diameter relatively smaller than that of the outer diameter of the collars;

expanding the inner diameter of each end of the shaft to form enlarged end regions each having an enlarged inner diameter sized to provide an interference fit with the collars of the yokes;

press fitting the collars of the yokes into the enlarged end regions of the shaft; and welding the yokes to the shaft to form permanent metallic bonds therebetween.

2. The method of claim 1 including providing a shaft having an initial outer diameter that is relatively smaller than the outer diameter of the collars.

3. The method of claim 1 including attaching balance weights to the enlarged end sections of the shaft.

4. The method of claim 3 wherein the balance weights are attached to the shaft in longitudinally spaced relation to the collars.

5. The method of claim 1 wherein the collars have a predetermined length and the end sections are formed with a length that is relatively greater than that of said collars.

6. The method of claim 5 wherein the lengths of the end sections are formed sufficiently long to accommodate the attachment of balance weights to the end sections at a location longitudinally spaced from the collar of the yokes.

7. A method of manufacturing an automotive prop shaft assembly comprising the steps of:

providing a pair of end yokes each having collars of predetermined outer diameter;

providing a tubular drive shaft having an initial inner diameter relatively less than that of the outer diameter of the collars;

expanding the shaft at its opposite ends to form enlarged end regions each having an enlarged inner diameter sized to provide an interference fit with the collars of the yokes and being of such length to accommodate the mounting of the balancing weights on the enlarged edge regions;

press fitting the collars of the yokes into the enlarged end regions of the shaft; and welding the yokes to the shaft.

* * * * *